March 6, 1962
J. E. GORRELL
3,024,078
RECORDER
Filed Dec. 4, 1957
2 Sheets-Sheet 1
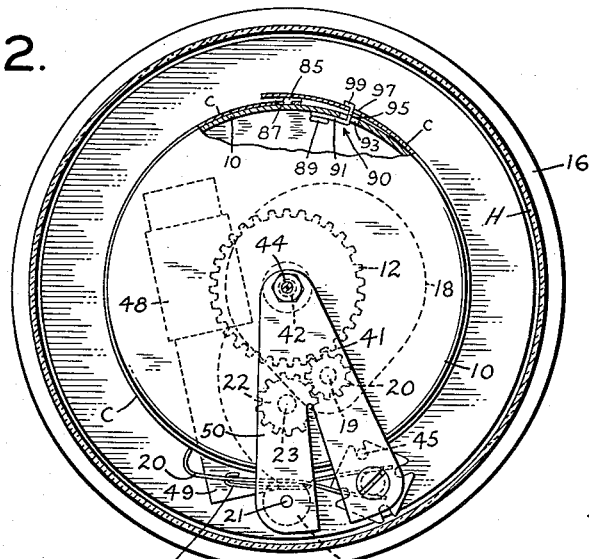
FIG. 2.
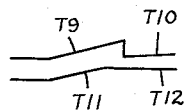
FIG. 7A.
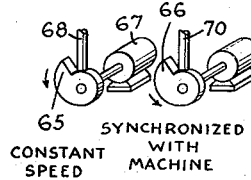
FIG. 7.
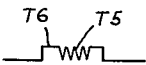
FIG. 6B.
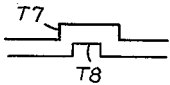
FIG. 6A.
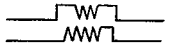
FIG. 6C.
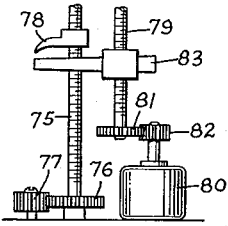
FIG. 8.
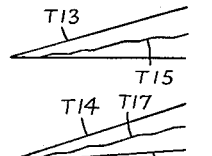
FIG. 8A.
FIG. 9.
FIG. 1.
INVENTOR
JOHN E. GORRELL
BY
Brumbaugh, Free, Graves & Donohue
HIS ATTORNEYS March 6, 1962 J. E. GORRELL 3,024,078
RECORDER
Filed Dec. 4, 1957 2 Sheets-Sheet 2

INVENTOR
JOHN E. GORRELL
BY
Brumbaugh, Free, Graves & Donohue
HIS ATTORNEYS

United States Patent Office 3,024,078
Patented Mar. 6, 1962

3,024,078
RECORDER
John E. Gorrell, Haworth, N.J., assignor to Electronic Associates, Inc., Long Branch, N.J., a corporation of New Jersey
Filed Dec. 4, 1957, Ser. No. 700,593
8 Claims. (Cl. 346—23)

This invention relates to improvements in recording apparatus and it relates more particularly to improved forms of operations recorders of a type capable of indicating qualitative and/or quantitative values of an input signal which is externally produced by the occurrence of some action or phenomena.

Many different kinds of recorders have been produced heretofore for producing records of the operations of machines, variations in depth, pressure, and volume, the use of electrical current and the like. Many such recorders employ a recording chart of disc-like or strip-like form on which a line is drawn or formed by means of a stylus, an electric discharge or by otherwise acting on the surface of the chart.

The present invention relates to a recorder by means of which a readily visible continuous or intermittent record covering an extended period of time, can be made on a relatively small sheet of recording paper, the record showing the occurrence and duration of phenomena or actions or the productivity or efficiency of a machine or process, or the machine operators or combinations of the same.

More particularly, the new recorder embodying the present invention is constructed and arranged so that the operating mechanism for the stylus or styli for making the chart is located so that only a small portion of its surface is concealed, thereby to enable readings to be made without removing the chart or any of the elements of the recorder.

A preferred embodiment of the invention includes a supporting member such as a rotatable drum or series of drums on which the recording chart is mounted and a stylus which is moved lengthwise of the drums transversely of the recording chart to form a substantially helical trace on the chart. The mechanism for rotating the drum and most of the mechanism for moving the stylus are usually housed in or under a drum to avoid interference with reading of the chart and/or to conserve space. A feature of the present invention is a novel mechanism for displacing the stylus relative to the recording chart to produce a trace or mark corresponding to an essentially instantaneous indication of the occurrence of some action or phenomena. In addition, means may be included in the recorder for actuating the stylus to make a secondary record imposed on the first trace and to indicate occurrence of another action or phenomena.

The recorder can be arranged to produce a quantitative displacement of the stylus which may be compared with a reference trace on the chart so that the efficiency of an operation as well as its occurrence can readily be determined by viewing the traces on the chart. Recorders of the types embodying the invention, therefore, can be used for many purposes for which prior recorders are not suitable and they are particularly adapted for determining the operating efficiency of machines and personnel.

For a better understanding of the present invention, reference may be had to the accompanying drawings in which:

FIGURE 1 is a view in vertical section through a recorder of the type embodying the present invention;

FIGURE 2 is a view in section taken on line 2—2 of FIGURE 1 with the drum rotated about 180° from the position shown in FIGURE 1 and with the chart and chart holding elements somewhat exaggerated in size to disclose details thereof;

FIGURES 6A, 6B and 6C are typical traces produced by means of recorders of the type embodying the present invention;

FIGURE 7 is a fragmentary and schematic view of actuating mechanism for a modified type of recorder;

Figures 3, 4, 5:
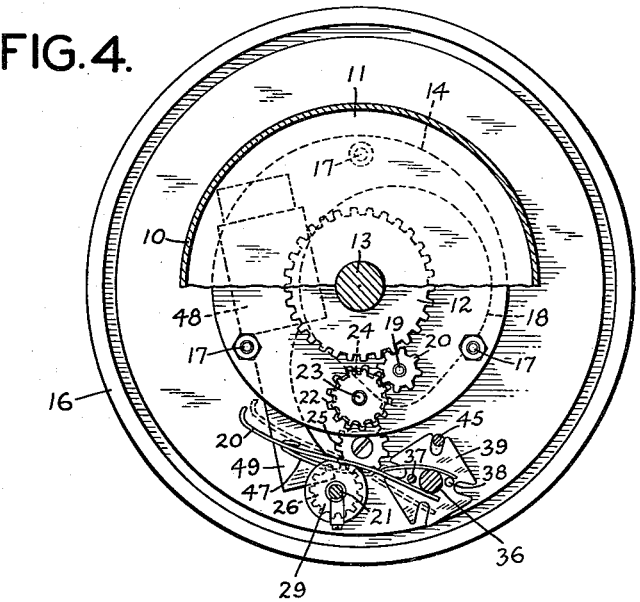
FIGURE 3 is a view in vertical section through a portion of the recorder to disclose details of construction.
FIGURE 4 is a view in section taken on line 4—4 of FIGURE 3 and partially broken away.
FIGURE 5 is a perspective view of a portion of the mechanism for actuating the stylus of the recorder.

FIGURE 7A discloses a portion of a trace produced by the modified apparatus disclosed in FIGURE 7;

FIGURE 8 is a schematic illustration of a modified drive mechanism for the styli of the recorder;

FIGURE 8A is a portion of a trace produced by the mechanism disclosed in FIGURE 8; and FIGURE 9 is a portion of a trace produced by a modified operation of the mechanism shown in FIGURE 8.

The present invention will be described with reference to typical recorders embodying the present invention. The recorder illustrated in FIGURES 1-5 includes a drum 10 for receiving a sheet of recording paper C forming a recording chart which is wrapped around the drum to produce a substantially continuous sleeve which can be marked around its entire periphery. The length of the chart can be varied by using drums of different sizes or by using a plurality of drums around which the chart is wrapped to form an elongated endless band. Sprocket teeth may be provided on the drum or drums to engage perforations in the chart as is common in many types of recorders. Any of several different kinds of recording paper may be used for the charts, such as paper adapted to be marked with ink from a ball-point or ink-feed type of stylus, or by means of a spark discharge, or, as preferred, a sheet of paper which is colored, for example, red, and has an opaque layer of wax thereon which is depressed and rendered transparent or scraped from the paper by a stylus to leave the colored paper exposed in the form of a narrow line or trace.

As best shown in FIGURES 3 and 4, the drum 10 has a partition plate 11 between its ends carrying a gear 12 by means of which the drum 10 is rotated. A friction clutch (not shown) may be interposed between the plate 11 and the gear 12 to allow the drum to be turned manually for adjusting its position and the position of the chart relative to the stylus. A shaft 13 is fixed to a plate 14 and extends through the gear 12 and the plate 11 and supports them for rotation. A shoulder 15 (FIGURE 1) at the upper end of the shaft 13 holds the lower edge of the drum 10 in spaced relation to the base 16 of the recorder. A plurality of posts 17 support the plate 14 in spaced relation to the base 16. A suitable motor, such as, for example, a synchronous motor 18 also is supported on the plate 14, and includes a drive shaft 19 which is connected by the gear 20 thereon to the gear 12. Any appropriate gear ratio between the motor 18 and the drum 10 may be used, depending on requirements. For example, the drum 10 may be driven at the rate of one revolution per hour, one revolution each eight hours, twelve hours or twenty-four hours or fraction or multiple thereof. If desired or necessary, the drum may be driven by a power source or transducer at a remote point by means of any suitable power transmitting mechanism.

A record is made on the chart paper C (FIGURE 1) by means of a stylus 20 formed of a strip of metal or the like, which has its left-hand end bent toward the drum and pointed to burnish the wax and render it transparent or to scrape a narrow line of wax from the chart C to expose the underlying colored paper. The stylus 20 is mounted on a screw threaded shaft or lead screw 21 which extends parallel with the axis of the drum 10 adjacent to the outer surface of the drum. Rotation is imparted to the lead screw 21 by means of a gear 22 meshing with the gear 20 and fixed to a shaft 23 journaled in the plate 14 and the base 16. A gear 24 fixed to the lower end of the shaft 23 meshes with a relatively thick idler 25 gear which drives the gear 26 fixed to the lower end of the lead screw 21. Appropriate gear ratios between the drum and the lead screw may be selected depending upon requirements.

Inasmuch as the lead screw is geared to the drum 10, the stylus is moved lengthwise of the drum as the drum rotates.

A bushing 29 or half-nut mounted on the lead screw is fixed to and supports the stylus 20 for movement by rotation of the lead screw. As best shown in FIGURE 5, the bushing 29 has an elongated slot or hole 30 therethrough enabling the bushing 29 to be moved radially of the lead screw 21. Threads 31 are formed along only one side of the slot 30 for engagement with or disengagement from the lead screw by radial movement of the bushing. Inward movement of the bushing 29 frees it from the lead screw 21 to permit the bushing and stylus 20 to be released from the lead screw for movement up or down independently of the rotation of the lead screw. In order to normally engage the half thread 31 with the lead screw, the bushing is provided with a spring member 32 having portions bearing against the lead screw and normally urging the bushing 29 outwardly.

Upon rotation of the drum 10 by means of the motor 18, the lead screw is also rotated so that the bushing 29 and the stylus 20 thereon move lengthwise of the drum with the chart C in engagement with the stylus to form a helical trace or record around the entire periphery of the drum. In this way, a very long trace can be obtained with a relatively small drum having a relatively short record chart C thereon.

The stylus 20 can be maintained in engagement with the chart at all times, if desired, or it can be arranged to form a trace during only part of the period of operation of the recorder. Intermittent recording is accomplished by means of the Geneva-drive disclosed in FIGURES 1, 4 and 5. As illustrated, the right-hand end of the stylus 20 has a curved extension 35 which bears against a shaft 36 fixed to the base 16 or against one of a pair of rods 37 or 38 on opposite sides of the shaft 36. The rods 37 and 38 are connected at their lower ends to a Geneva gear 39 and at their upper ends by means of a collar 40. The Geneva gear 39 and the collar 40 are rotatably supported on the shaft 36 which is retained against upward movement and in parallelism with the axis of the drum by means of a plate 41 which rests on a shoulder 42 (FIG. 2) on the shaft 13 extending through and disposed above the upper end of the drum 10 and is secured at its outer end to the upper end of the shaft 36. The plate 41 is clamped against the shoulder 42 by means of a nut 43 threaded on the reduced diameter screw 44 extending from the upper end of the shaft 13.

Cooperating with the Geneva gear 39 is a pin 45 fixed to the lower edge of the drum 10 in such position that it engages in one of the four notches 46 in the gear 39 and thus rotates it a quarter of a turn each time the pin passes by the gear. When the flattened portion 35 of the stylus engages either of the rods 37 or 38, the point of the stylus is pressed against the chart C, and when the Geneva gear 39 and the rods 37 and 38 are positioned so that the flat end 35 of the stylus engages the shaft 36, the stylus is moved out of engagement with the chart by means of the spring 47 which passes through the stylus and has a free end bearing against the rod 36 and the rods 37 and 38 on the opposite sides thereof from the flattened portion 35 of the stylus. With this arrangement, the stylus engages the chart every other revolution of the drum 10. Other variations may be made in the Geneva drive to cause intermittent engagement of the stylus with the chart at other time intervals.

In order to make a qualitative or quantitative record on the chart C, the lead screw 21 with the stylus thereon is movable endwise to displace the stylus vertically with respect to the drum and chart 10. This motion is accomplished by means of an electromagnet 48 mounted on the base 16 of the recorder which lifts an armature 49 hinged to the base at one end and having its other end disposed beneath the gear 26. As the armature 49 is lifted it also lifts the gear 26 and the lead screw 21. The thickness of the gear 25 allows such upward movement of the lead screw without disconnecting the motor 18 from the lead screw 21. In order to permit the lead screw to lift, its upper end is received in a resilient arm 50 extending from the plate 41 and its lower end is received slidably in a bearing 51.

The recorder described above may be enclosed in a transparent housing H which is clamped against the base 16 by means of a nut on the shaft 44.

Assuming that the drum 10 is being driven at a constant speed by means of the synchronous motor and the electromagnet 48 is connected to a circuit including an apparatus or other device, the stylus will make a slightly inclined trace T' on the chart. When the apparatus connected to the electromagnet 48 is started, the electromagnet 48 is energized, thereby lifting the armature 49 and the lead screw 21 with the stylus thereon thereby making a vertical trace T2 on the chart C. So long as the electromagnet 48 is energized, rotation of the drum 10 and lead screw 21 will make a mark T3 parallel with the trace T1. When the electromagnet 48 is deenergized, the lead screw and the stylus 20 drop down forming a vertical trace T4. In this way, it is possible to determine the number of times that the apparatus connected to the electromagnet is started and stopped and the duration of operation of the apparatus. With a chart ruled to indicate time of day or night and the drum 10 driven at a corresponding speed, the trace on the chart also shows when the machine is started and stopped.

If desired, in order to provide a base or reference trace for easier reading of the chart, a second lead screw 51, shown in dotted lines in FIGURE 1 may also be provided. A stylus 20' is mounted on the lead screw 51 in a manner similar to the mounting of stylus 20 on the lead screw 21, but the lead screw 51 is not mounted for endwise movement. The lead screw 51 is threaded oppositely to the screw 21 and is connected to the lead screw gear 26 by means of the gear 52 so that the styli thereon move in the same direction at the same speed. In this way, the stylus 20' makes a continuous helical line around the chart, while the stylus 20 produces a displaced, interrupted or zigzag line indicative of the operation of a machine with which the recorder is associated.

It will be understood that the lead screw 51 can be mounted for endwise movement in the same way as the lead screw 21 and connected to another machine or apparatus to make two records of two different operations.

The recorder can be modified as shown in FIGURE 3 to give two separate indications by means of the stylus 20. Thus, the electromagnet 48 is connected to one machine or other device by means of the conductors 54 and 55. A vibratable reed 56 and a fixed contact 57 are interposed in the conductor 54 and are normally biased into contact to complete a circuit through the conductor 54. An electromagnet 58 is disposed adjacent to the reed. A contact section 59 of the reed 56 insulated from the contact 57 is biased against a contact 60 which is connected to one terminal of the electromagnet 58. The contact section 59 of the reed and the opposite terminal 63 of the electromagnet are connected to another apparatus device for recording its operation.

When a signal is received from the apparatus connected to the conductors 54 and 55, the electromagnet 48 will be energized or deenergized, thereby raising or lowering the lead screw 21. When a signal is received on conductors 62 and 63, the electromagnet 58 and reed 56 form a buzzer or interrupter moving the reed 56 into and out of engagement with the contacts 57 and 60. Disengagement of the reed and contacts, breaks the circuits through conductor 54 and the electromagnet 58 causing the electromagnet 48 to be energized and deenergized, thereby moving the stylus 20 up and down and producing a wide or zigzag trace T5 in the raised or displaced portion T6 of the trace shown in FIGURE 6B. In this way, the recorder can indicate when a signal is received from the source connected to the conductors 54 and 55, and also to indicate when a signal is received from the other source connected to the conductors 62 and 63. This arrangement may be utilized to indicate the degree of efficiency or the length of operation of a machine. Knowing the 100% efficiency of operation of a machine in terms of its operating speed and frequency of operation, a signal may be supplied on the conductors 54 and 55 to cause the displacement T6 corresponding to 100% efficient operation of the machine. The conductors 62 and 63 may be connected to the machine and when it is set into operation, it will produce a zigzag trace T5 corresponding to the period of operation of the machine. By comparing the length of the zigzag portion of the trace with the displaced portion of the trace produced by the electromagnet 48, it is possible to determine the efficiency of operation of the machine.

When using two styli, both arranged to be displaced by incoming signals, it is possible, as shown in FIGURE 6A, to produce two simultaneous traces which may be the same or different depending on the duration of the signals. One of the traces, for example, the upper trace T7 may be the 100% operation trace, while the trace T8 represents the actual operation of the machine.

FIGURE 6C shows the operation of a single stylus on the adjacent portions of the helical trace produced at different times, for example, twenty-four hours apart in a recorder in which the drum 10 is rotated one revolution per day, with a second signal of different duration imposed upon the first signal. A similar record may be produced with two styli, each of which is responsive to a primary and a secondary signal, the traces in this case being made by different styli.

FIGURES 7 and 7A illustrate schematically another means for lifting a lead screw carrying a stylus. Instead of an electromagnet, a cam driven by a motor may be used to lift the lead screw. Also, as illustrated, two cams 65 and 66 may be used to lift two lead screws. Moreover, by suitably driving the cams 65 and 66, it is possible to produce a quantitative indication of a change of condition. Thus, the cam 65 is driven at constant speed by means of a synchronous motor 67 to move the lead screw 68 slowly upwardly over a predetermined period of time as indicated by the inclined portion T9 of the trace T10. The synchronous motor 67 is set into operation when a signal is transmitted to it by starting a machine and continues to rotate until the lead screw 68 drops off the high point of the cam.

A "follow-up" or Selsyn type of motor 69 drives the cam 66 and is synchronized with the operation of the machine. After the machine is started, if its speed is less than its 100% efficiency speed as indicated by the rotation of the cam 65, the inclined portion T11 of the trace T12 produced by the stylus on the lead screw 70 will lag behind the trace T9, and when the machine stops the trace will level off on about a horizontal line, thereby showing the rate of operation of the machine and its period of operation.

Other indications of the operation of a machine or other device may also be obtained. Thus for example, instead of connecting the lead screw to a cam or an electromagnet armature for indicating substantially instantaneous reception of signals, the lead screw may be connected with a float for example in a vessel containing liquid, so that the lead screw is moved up and down as the level of the liquid changes in the vessel. The lead screw is nevertheless rotated continuously with the drum in order to produce a trace around the chart C on the drum.

Still another type of operations recorder is schematically illustrated in FIGURE 8. In this recorder, the arrangement of the drum and its drive mechanism may be similar to that shown in FIGURES 1 and 2. The mechanism used to drive the drum also drives the lead screw 75 and may include a gear 76 at the lower end of the lead screw which meshes with an idler 77 corresponding to the idler 25 shown in FIGURE 2. A stylus 78 is mounted on the lead screw 75 in any suitable way, such as, for example, on a half-nut similar to the half-nut 29 shown in FIGURE 5. In this way, the stylus 78 makes a trace T13 or T14 on a record chart, as shown in FIGURES 8A and 9.

A second lead screw 79 is driven by means of an electric motor through suitable gears 81 and 82 connected to the lead screw 79 and motor 80, respectively. The motor 80 may be either of two types, namely (1) a constant speed motor capable of driving the stylus 83 on the lead screw 79 at the same speed as the stylus 78, or (2) a two-speed motor for driving the stylus 83 at a lower speed and at a higher speed.

The single speed motor 80 is energized in response to an action, such as initiation of the operation of a machine, and is deenergized when the machine stops. The stylus 83, accordingly, is alternately driven and stopped thereby producing a trace on the record chart like the trace T15 shown in FIGURE 8A.

The inclined portions of the trace correspond to operations of the machine, and the horizontal portions of the trace T15 correspond to nonoperation of the machine. By comparing the trace T15 with the trace T13, which indicates 100% operating efficiency, it is possible to determine directly the actual percentage efficiency of operation of the machine or of its operator.

With the two-speed type of motor, the stylus 83 is driven continuously during operation of the recorder at a lower speed than the stylus 78, as indicated by the trace T16 in FIGURE 9. When a signal of the occurrence of an action, such as starting of a machine, is received, the speed of the motor 80 is increased to its higher speed, thereby producing the more sharply inclined portions of the trace T17 which have the same inclination as the trace T14. When the machine is stopped, the speed of the motor 80 is reduced to its lower speed producing the portions of the trace T17 which are parallel with the trace T16. The trace T17 thereby gives directly a percentage indication of the efficiency of the operation of the machine or its operator.

Inasmuch as the recording chart C extends around the drum of the recorders described above, it is desirable to provide means enabling the charts to be removed and replaced readily and which will retain the charts securely and smoothly on the drum. A highly satisfactory chart retaining means in shown in FIGURES 1 and 2. Extending outwardly from the drum 10 are a pair of undercut pins 85 and 86 which engage in holes 87 and 88 adjacent to the leading end of the chart C. Mounted on a pin or lug 89 inside the drum 10 is a double arm spring 90 having outwardly diverging arms 91 and 92 with substantially radially extending end portions passing through slots 93 and 94 in the drum spaced from the leading end of the chart C. The ends 95 and 96 of the arms extend through holes 97 and 98 near the trailing end of the chart C which overlaps and extends beyond the leading end of the chart. Hook-like tips 99 and 100 on the ends 95 and 96 of the arms are engageable with the trailing edges of the holes 97 and 98. The arms 91 and 92 normally are biased toward the ends of the drum 10 and toward the pins 85 and 86 so that the chart is drawn tightly around the drum 10 and the trailing edge of the chart is tensioned in a direction lengthwise of the drum to hold the trailing edge taut and straight. In this way, the chart C is conformed smoothly to the surface of the drum 10 without ripples or bumps which might cause inaccurate marking of the chart by the stylus.

Other equipment may be provided on the recorder such as a clock controlled printing means for printing time, dates and other data on the chart to facilitate its interpretation.

From the preceding description, it will be apparent that recorders of the type embodying the present invention produce quantitative or qualitative records and display the records for visual inspection as they are made and that the recorders are susceptible to considerable modification to satisfy the requirements for providing useful data and information. Accordingly, the forms of the invention disclosed herein should be considered as illustrative and not as limiting the scope of the following claims.

I claim:

1. An operations recorder comprising a rotatable drum adapted to receive a record chart thereon, means for rotating said drum at approximately constant peripheral speed, a lead screw extending substantially parallel with the axis of said drum, means connecting said lead screw to said drum for rotating said lead screw at a speed corresponding to the speed of said drum, a stylus mounted on said lead screw for movement thereby lengthwise of said lead screw, means connected to said lead screw and responsive to a signal of an action at a first source to be recorded for moving said lead screw endwise, and means responsive to a signal of an action at a second source to be recorded for vibrating said stylus transversely of said chart throughout the duration of the signal at said second source.

2. The recorder set forth in claim 1 in which the means for moving the lead screw endwise comprises an electromagnet adapted to be energized by said signal and an armature movable by said electromagnet and connected to said lead screw, and the means for vibrating said stylus comprises an interrupter responsive to said signal from said second source and connected between said first source and said electromagnet for intermittently energizing and de-energizing said electromagnet.

3. An operations recorder comprising a movable member for supporting a record chart, means for moving said member at a substantially constant speed, a first stylus adjacent to said member for making a first trace on said chart providing a standard of comparison, first means for moving said stylus substantially transversely of said chart at approximately constant speed, a second stylus adjacent to said first stylus for making a second trace on said chart adjacent to said first trace for indicating an action at a source, second means for moving said second stylus substantially transversely of said chart at approximately constant speed, and third means connected to said second stylus for moving it additionally relative to said chart in response to a signal from said source of an action at said source to modify said second trace in accordance with said action and its duration.

4. The operations recorder set forth in claim 3 in which said first and second means for moving said styli are lead screws extending substantially transversely of said member and said third means comprises an armature connected to said second lead screw and an electromagnet for moving said armature to move said second lead screw endwise.

5. The recorder set forth in claim 3, in which said first and second means for moving said styli are lead screws extending substantially transversely of said member and said third means comprises a cam connected to said second lead screw and a timing motor responsive to said signal for moving said cam to move said second lead screw endwise.

6. The recorder set forth in claim 4 comprising an interruptor connected between said electromagnet and said first source for vibrating said armature in response to a signal from a second source of an action at said second source.

7. An operations recorder comprising a movable member for supporting a record chart, means for moving said member at substantially a constant speed, a first stylus adjacent to said member for making a first trace on said chart providing a standard of comparison, means for moving said stylus substantially transversely of said chart at approximately constant speed, a second stylus adjacent to said first stylus for making a second trace on said chart adjacent to said first trace, a motor for moving said second stylus substantially transversely of said chart, and means connected with said motor and responsive to a signal from a first source of an action at said source for changing the speed at which said second stylus is moved transversely of said chart to modify said second trace in accordance with said action and its duration.

8. An operations recorder comprising a movable member for supporting a record chart, means for moving said member at a substantially constant speed, a first stylus adjacent to said member for making a first trace on said chart providing a standard of comparison, first means for moving said stylus substantially transversely of said chart at approximately constant speed, a second stylus adjacent to said first stylus for making a second trace on said chart adjacent to said first trace, and second means connected to said second stylus for moving it transversely relative to said chart in response to a signal from a first source of an action at said source to modify the trace made thereby and provide an indication of said action and its duration.

References Cited in the file of this patent

UNITED STATES PATENTS

| | | |
|---|---|---|
| 981,989 | Fitch | Jan. 17, 1911 |
| 1,099,738 | Doyle | June 9, 1914 |
| 1,114,348 | Flynn | Oct. 20, 1914 |
| 1,322,148 | Sprague | Nov. 18, 1919 |
| 1,379,528 | Clark | May 24, 1921 |
| 2,387,563 | Chapple | Oct. 23, 1945 |
| 2,447,018 | Keinath | Aug. 17, 1948 |
| 2,665,607 | Blakeslee et al. | Jan. 12, 1954 |
| 2,682,798 | Schock | July 6, 1954 |
| 2,729,453 | Camras | Jan. 3, 1956 |
| 2,775,503 | Peterson | Dec. 25, 1956 |
| 2,926,984 | Gerbrands | Mar. 1, 1960 |

FOREIGN PATENTS

| | | |
|---|---|---|
| 278,800 | Germany | Oct. 5, 1914 |
| 373,238 | Germany | Feb. 14, 1922 |
| 556,344 | Great Britain | Sept. 30, 1943 |
| 305,615 | France | 1901 |